United States Patent
Zhang et al.

(10) Patent No.: US 10,412,201 B2
(45) Date of Patent: Sep. 10, 2019

(54) CLEAR TO SEND-TO-SELF TRANSMISSIONS IN AN LTE-CONTROLLED WI-FI SYSTEM

(71) Applicant: QUALCOMM Incorporated, San Diego, CA (US)

(72) Inventors: Lei Zhang, New Brunswick, NJ (US); Chong Li, Jersey City, NJ (US); Xinzhou Wu, Hillsborough, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 14/939,721

(22) Filed: Nov. 12, 2015

(65) Prior Publication Data

US 2017/0142235 A1    May 18, 2017

(51) Int. Cl.
| | |
|---|---|
| *H01L 29/06* | (2006.01) |
| *H04L 12/741* | (2013.01) |
| *H04W 72/04* | (2009.01) |
| *H04L 5/00* | (2006.01) |
| *H04W 74/08* | (2009.01) |
| *H04L 29/06* | (2006.01) |

(52) U.S. Cl.
CPC ............. *H04L 69/22* (2013.01); *H04L 5/001* (2013.01); *H04L 5/0053* (2013.01); *H04L 45/74* (2013.01); *H04W 72/0446* (2013.01); *H04W 74/0816* (2013.01)

(58) Field of Classification Search
CPC ..... H04L 45/74; H04L 69/22; H04W 72/0446
See application file for complete search history.

(56) References Cited

U.S. PATENT DOCUMENTS

| 7,477,616 B2 | 1/2009 | Wang et al. |
| 9,100,975 B2 | 8/2015 | Palanivelu et al. |
| (Continued) | | |

FOREIGN PATENT DOCUMENTS

WO    WO-2015038057 A1    3/2015

OTHER PUBLICATIONS

ISA/EP, International Search Report and Written Opinion of the International Searching Authority, Int'l Application No. PCT/US2016/057090, dated Jan. 17, 2017, European Patent Office, Rijswijk, NL, 10 pgs.

*Primary Examiner* — Jeffrey M Rutkowski
*Assistant Examiner* — Chae S Lee
(74) *Attorney, Agent, or Firm* — Holland & Hart LLP

(57) ABSTRACT

Methods, systems, and devices for wireless communication are described. A base station may perform a clear channel assessment (CCA) procedure on a channel that includes multiple sub-bands of a radio frequency spectrum band. The base station may determine that the channel is available based on the CCA and transmit a special header in the channel. In some examples, the special header may include multiple transmission time intervals (TTIs), where each TTI may include a header packet in each sub-band of the radio frequency spectrum band. In some cases, the header packet may include a clear to send (CTS)-to-self frame structure. The base station may transmit a first TTI across each of the sub-bands at a first power level, and transmit additional TTIs across the sub-bands at a different power level. Additional header packets may be transmitted at the boundaries of subsequent subframes.

30 Claims, 12 Drawing Sheets

(56) References Cited

U.S. PATENT DOCUMENTS

| | | |
|---|---|---|
| 2013/0258989 A1 | 10/2013 | Ribeiro et al. |
| 2015/0009907 A1 | 1/2015 | Merlin et al. |
| 2015/0063099 A1 | 3/2015 | Sadek |
| 2015/0098397 A1 | 4/2015 | Damnjanovic et al. |
| 2015/0103782 A1 | 4/2015 | Xu et al. |
| 2016/0066324 A1* | 3/2016 | Li .......................... H04L 69/22 370/338 |
| 2016/0095110 A1* | 3/2016 | Li ..................... H04W 72/1215 370/329 |
| 2016/0142920 A1* | 5/2016 | Suzuki ................. H04W 16/14 370/336 |
| 2017/0094546 A1* | 3/2017 | Chai ..................... H04W 24/10 |
| 2017/0208475 A1* | 7/2017 | Yi ........................ H04W 16/14 |

\* cited by examiner

CLEAR TO SEND-TO-SELF TRANSMISSIONS IN AN LTE-CONTROLLED WI-FI SYSTEM

BACKGROUND

The following relates generally to wireless communication, and more specifically to clear to send-to-self transmissions in an LTE controlled Wi-Fi system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may be otherwise known as user equipment (UE).

Some wireless communications systems may operate using a first radio access technology (RAT), such as LTE, and may include a number of base stations, each simultaneously supporting communications with multiple user equipments (UEs). A second wireless communications multiple-access system may operate according to a second RAT, such as Wi-Fi, and may include a number of base stations or access points (APs), each simultaneously supporting communication for multiple mobile devices in a shared frequency spectrum. If multiple wireless technologies, such as LTE and Wi-Fi, are used in an area that supports multiple APs, UEs and base stations, simultaneous transmissions from these wireless devices may interfere with one another and may degrade communications between devices.

SUMMARY

A base station may perform a clear channel assessment (CCA) procedure on a channel that includes multiple sub-bands of a radio frequency spectrum band. The base station may determine that the channel is available based on the CCA and may subsequently transmit a special header. In some examples, the special header may include multiple transmission time intervals (TTIs), where each TTI may include a header packet in each sub-band of the radio frequency spectrum band. In some cases, the header packet may include a clear to send (CTS)-to-self frame structure. The base station may transmit a first TTI across each of the sub-bands at a first power level, and transmit additional TTIs across the sub-bands at a different power level. Additional header packets may be transmitted at the boundaries of subsequent subframes.

A method of wireless communication is described. The method may include performing a clear channel assessment (CCA) procedure on a channel operating across multiple sub-bands of a radio frequency (RF) spectrum band, determining the channel is available based at least in part on the performed CCA and transmitting a special header in the channel operating across multiple sub-bands, wherein the special header comprises two or more transmission time interval (TTI)s, each TTI comprising a header packet in each of two or more sub-bands.

An apparatus for wireless communication is described. The apparatus may include means for performing a CCA procedure on a channel operating across multiple sub-bands of a RF spectrum band, means for determining the channel is available based at least in part on the performed CCA and means for transmitting a special header in the channel operating across multiple sub-bands, wherein the special header comprises two or more TTIs, each TTI comprising a header packet in each of two or more sub-bands.

A further apparatus is described. The apparatus may include a processor, memory in electronic communication with the processor, and instructions stored in the memory. The instructions may be operable to cause the processor to perform a CCA procedure on a channel operating across multiple sub-bands of a RF spectrum band, determine the channel is available based at least in part on the performed CCA and transmit a special header in the channel operating across multiple sub-bands, wherein the special header comprises two or more TTIs, each TTI comprising a header packet in each of two or more sub-bands.

A non-transitory computer readable medium for wireless communication is described. The non-transitory computer-readable medium may include instructions to cause a processor to perform a CCA procedure on a channel operating across multiple sub-bands of a RF spectrum band, determine the channel is available based on the performed CCA and transmit a special header in the channel operating across multiple sub-bands, where the special header comprises two or more TTIs, each TTI comprising a header packet in each of two or more sub-bands.

Some examples of the method, apparatus, or non-transitory computer-readable medium described above may further include processes, features, means, or instructions for transmitting a first TTI of the two or more TTIs across each of the two or more sub-bands at a first power level. Some examples of the method, apparatus, or non-transitory computer-readable medium described above may further include processes, features, means, or instructions for transmitting one or more subsequent TTIs of the two or more TTIs across the two or more sub-bands at a different power level.

In some examples of the method, apparatus, or non-transitory computer-readable medium described above, the first power level is less than the different level. In some examples of the method, apparatus, or non-transitory computer-readable medium described above, the header packet comprises a clear to send-to-self frame structure. Some examples of the method, apparatus, or non-transitory computer-readable medium described above may further include processes, features, means, or instructions for transmitting one or more additional header packets in the two or more sub-bands of the RF spectrum band, where each of the additional header packets are transmitted at the first power level or the different power level.

In some examples of the method, apparatus, or non-transitory computer-readable medium described above, the one or more additional headers are transmitted synchronously at a boundary of subsequent subframes. Some examples of the method, apparatus, or non-transitory computer-readable medium described above may further include processes, features, means, or instructions for transmitting the header packet in a consecutive pattern across each sub-band of the RF spectrum band, where the consecutive pattern is based on the CCA.

Some examples of the method, apparatus, or non-transitory computer-readable medium described above may further include processes, features, means, or instructions for transmitting the header packet in a non-consecutive pattern across each sub-band of the RF spectrum band, where the non-consecutive pattern is based on the CCA. Some examples of the method, apparatus, or non-transitory computer-readable medium described above may further include processes, features, means, or instructions for transmitting the special header at a first time for a first operator and a second time for a second operator.

In some examples of the method, apparatus, or non-transitory computer-readable medium described above, the first time is different than the second time. In some examples of the method, apparatus, or non-transitory computer-readable medium described above, the special header is of a first configuration for a first operator and a second configuration for a second operator. In some examples of the method, apparatus, or non-transitory computer-readable medium described above, the header packet comprises a wireless fidelity (Wi-Fi) frame structure.

DETAILED DESCRIPTION

Figure 1:
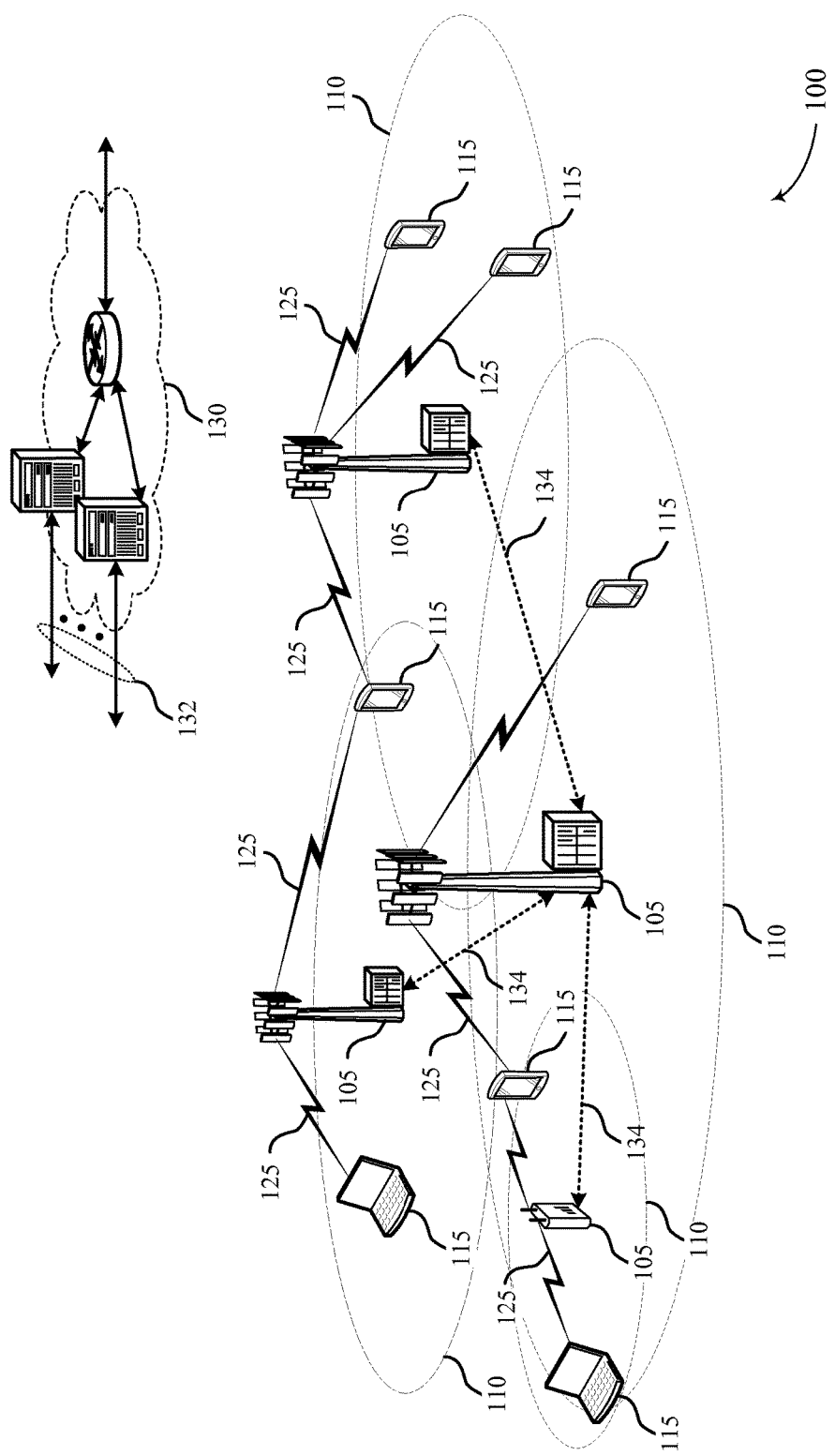
FIG. 1 illustrates an example of a wireless communications system that supports clear to send-to-self transmissions in an LTE controlled Wi-Fi system in accordance with aspects of the present disclosure.

Wireless wide area networks (WWANs), such as LTE/A networks, may include a number of base stations, each simultaneously supporting communications for multiple user equipments (UEs). Communications in such WWANs may be transmitted over multiple radio frequency bands (e.g., an 80 MHz band that includes four 20 MHz bands) in a dedicated or licensed spectrum. WWANs may coexist with wireless local area networks (WLANs), such as Wi-Fi networks, which may include a number of base stations or access points (APs) that simultaneously support communication for multiple mobile devices or stations over a shared frequency spectrum. WLANs may use contention based procedures, such as a clear channel assessment (CCA), that include communicating one or more control frames prior to establishing a communication link in the shared frequency spectrum. In a WWAN using time division duplexing (TDD) based communications, a CCA may be performed for a number of consecutive frames.

A hybrid approach of WWAN and WLAN may be used, where the dedicated spectrum may be used for network messaging (e.g., control information, radio resource control (RRC) signaling, etc.), while the shared spectrum may be used for data transmission. This hybrid approach may be referred to as an LTE-controlled Wi-Fi (LTE-CW) network. In a wireless system utilizing LTE-CW, the robustness of the dedicated band may be leveraged to use an LTE link to improve performance and coverage of the Wi-Fi link in the unlicensed band. LTE-CW technology may be used in areas that support multiple UEs and/or other base stations from different operators.

An LTE-CW base station may transmit a Wi-Fi compatible header at different instances during a DL frame. For example, the Wi-Fi compatible header may be transmitted once the base station detects that the channel is clear after completing a CCA, and again at subsequent downlink subframe boundaries in the same frame. The transmissions of any additional LTE-CW base stations for other operators or any additional Wi-Fi APs within the range of the LTE-CW base station may be deferred. The header may include a clear to send (CTS)-to-Self frame transmission (e.g., a transmission of a CTS packet that includes the sending nodes own address) used in Wi-Fi systems. The CTS-to-Self transmission may provide network allocation vector NAV protection to the subsequent frames in the communication sequence.

In some cases, a CTS-to-Self header may be transmitted by a base station following a CCA procedure across multiple sub-bands in a shared frequency spectrum. For example, a base station may determine that a channel is clear based on the CCA procedure and transmit a special header. The special header may include multiple transmission time intervals (TTIs) that each include a header packet in each sub-band (e.g., multiple 20 MHz header packets). Additionally or alternately, the base station may transmit the header packets in a duplicated format in all sub-bands at subsequent downlink subframe boundaries within the same frame. In some examples, the LTE-CW base station may transmit the special header that includes header packets with equal power level (e.g., at half power) in all scheduled sub-bands and then alternate transmissions of header packets at a different power level in each sub-band (e.g., at full power).

In some examples, a fixed transmission pattern of header packets may be used for a special header transmission, where the headers in all sub-bands may be transmitted with evenly split power followed by sequential headers in each sub-band with full power. In other cases, the header packets may be transmitted in a random or predetermined hopping pattern (e.g., a non-consecutive pattern over all sub-bands).

Aspects of the disclosure are initially described in the context of a wireless communication system. Specific examples of a subframe and header configuration are further provided. Aspects of the disclosure are further illustrated by and described with reference to apparatus diagrams, system diagrams, and flowcharts that relate to CTS-to-self transmissions in an LTE controlled Wi-Fi system.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may support the use of a special header transmission within a subframe. The special header may include a header packet that includes a CTS-to-Self frame structure, which may be transmitted according to different techniques.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

In some cases, a UE 115 or base station 105 may operate in a shared or unlicensed frequency spectrum. These devices may perform a CCA prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence. In some cases, a CCA procedure may be used in an LTE-CW network, where multiple frequency bands may be used for communication.

Time intervals in LTE may be expressed in multiples of a basic time unit (e.g., the sampling period, Ts=1/30,720,000 seconds). Time resources may be organized according to radio frames of length of 10 ms (Tf=307200Ts), which may be identified by an system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix (CP) prepended to each symbol). Excluding the CP, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers (CCs) using short TTIs).

In some cases, a wireless communications system may utilize one or more ECCs. An ECC may be characterized by one or more features including: flexible bandwidth, variable length TTIs, and modified control channel configuration. In some cases, an ECC may be associated with a carrier aggregation configuration or a dual connectivity configuration (i.e., when multiple serving cells have a suboptimal backhaul link). An ECC may also be configured for use in unlicensed spectrum or shared spectrum (where more than one operator is licensed to use the spectrum). An ECC characterized by flexible bandwidth may include one or more segments that may be utilized by UEs 115 that are not capable of monitoring the whole bandwidth or prefer to use a limited bandwidth (e.g., to conserve power).

In some cases, an ECC may utilize a variable TTI length, which may include use of a reduced or variable symbol duration. In some cases the symbol duration may remain the same, but each symbol may represent a distinct TTI. In some cases an ECC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing.

Flexible bandwidth and variable TTIs may be associated with a modified control channel configuration (e.g., an ECC may utilize an ePDCCH for DL control information). For example, one or more control channels of an ECC may utilize FDM scheduling to accommodate flexible bandwidth use. Other control channel modifications include the use of additional control channels (e.g., for eMBMS scheduling, or to indicate the length of variable length UL and DL bursts), or control channels transmitted at different intervals. An ECC may also include modified or additional HARQ related control information.

In some cases, a UE 115 (or an AP 105) may be detectable by a central AP 105, but not by other UEs 115 in the coverage area 110 of the central AP 105. For example, one UE 115 may be at one end of the coverage area 110 of the central AP 105 while another UE 115 may be at the other end. Thus, both UEs 115 may communicate with the AP 105, but may not receive the transmissions of the other. This may result in colliding transmissions for the two UEs 115 in a contention based environment (e.g., CSMA/CA) because the UEs 115 may not refrain from transmitting on top of each other. A UE 115 whose transmissions are not identifiable, but that is within the same coverage area 110 may be known as a hidden node. Carrier sense multiple access with collision avoidance (CSMA/CA) may be supplemented by the exchange of a request-to-send (RTS) packet transmitted by a sending UE 115, base station 105, or AP 105 and a clear-to-send (CTS) packet transmitted by the receiving UE 115, base station 105, or AP 105. This may alert other devices within range of the sender and receiver not to transmit for the duration of the primary transmission. Thus, RTS/CTS may help mitigate a hidden node problem.

A base station 105 may perform a CCA procedure on a channel that includes multiple sub-bands of a radio frequency spectrum band. The base station 105 may determine that the channel is available based on the CCA and may subsequently transmit a special header. In some examples, the special header may include multiple TTIs, where each TTI may include a header packet in each sub-band of the radio frequency spectrum band. In some cases, the header packet may include a CTS-to-self frame structure. The base station may transmit a first TTI across each of the sub-bands at a first power level, and transmit additional TTIs across the sub-bands at a different power level. Additional header packets may be transmitted at the boundaries of subsequent subframes.

Figure 2:
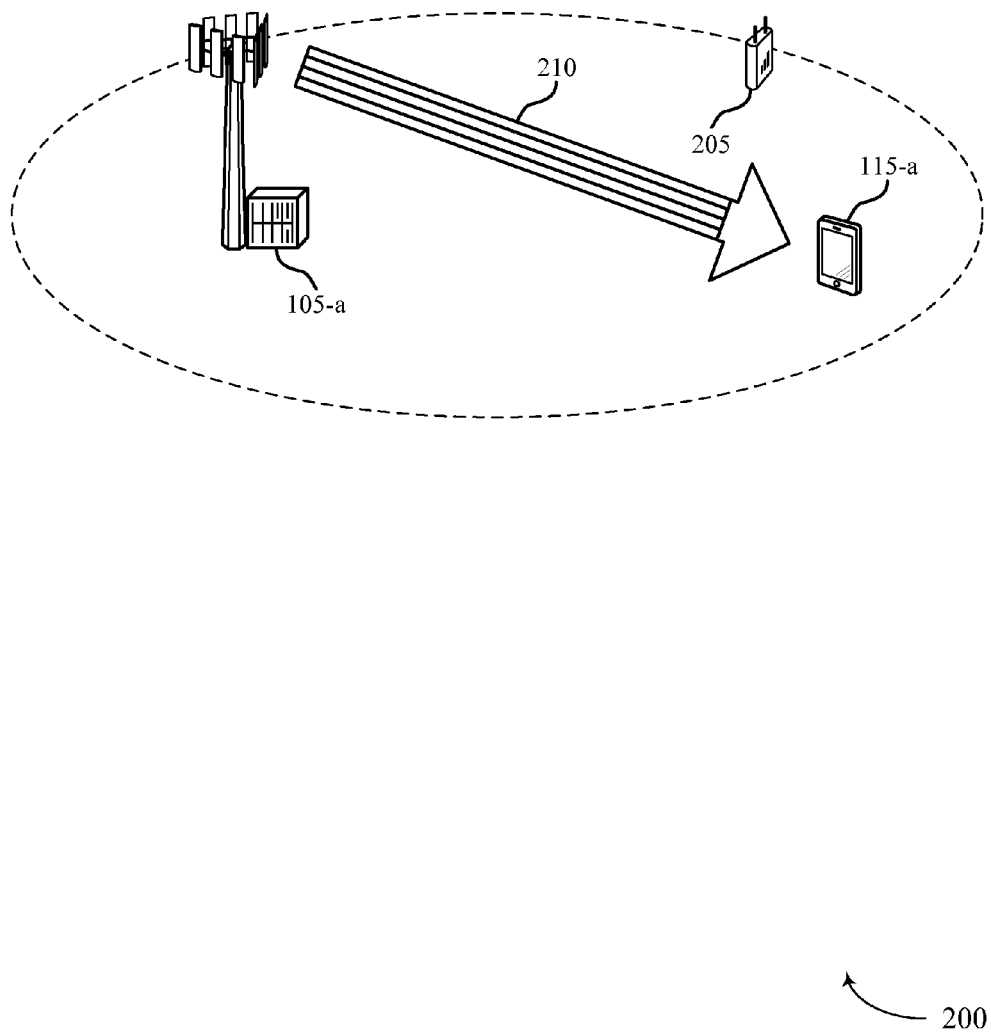
FIG. 2 illustrates an example of a wireless communications system that supports clear to send-to-self transmissions in an LTE controlled Wi-Fi system in accordance with aspects of the present disclosure.

FIG. 2 illustrates an example of a wireless communications system 200 for CTS-to-self transmissions in an LTE controlled Wi-Fi system. Wireless communications system 200 may include base station 105-a, UE 115-a, and Wi-Fi AP 205, which may be examples of the corresponding devices described with reference to FIG. 1. Wireless communications system 200 may be an example of an LTE-CW network, where transmissions over a data channel 210 may utilize the shared spectrum, while transmissions over a control channel may use the dedicated spectrum. Wireless communications system 200 may support communication in a shared radio frequency spectrum using a special header, where the special header may include multiple header packets with a CTS-to-Self frame structure.

Wireless wide area networks (WWANs), such as LTE/A networks, may include a number of base stations, each simultaneously supporting communications for multiple UEs. In some cases, uplink (UL) and downlink (DL) communications may be transmitted over multiple radio frequency bands (e.g., an 80 MHz band that includes four 20 MHz bands) in a dedicated or licensed spectrum. Such WWANs may coexist with wireless local area networks (WLANs), such as Wi-Fi networks, which may include a number of base stations or access points (APs) that simultaneously support communication for multiple mobile devices or stations over a shared frequency spectrum.

WLANs may use contention based procedures that include communicating one or more control frames prior to establishing a communication link in the shared frequency spectrum. For example, devices may perform a clear channel assessment (CCA) procedure before every data packet transmission. For WWANs operating in the shared frequency spectrum, devices may transmit packets following each successful CCA. In a WWAN using time division duplexing (TDD) based communications, a CCA may be performed for a number of consecutive frames, which may have cell-specific configurations for UL and DL transmissions.

A hybrid approach of WWAN and WLAN may be used, where the dedicated spectrum may be used for network messaging (e.g., control information, radio resource control (RRC) signaling, etc.), while the shared frequency spectrum may be used for data transmission. This hybrid approach may be referred to as an LTE-CW network. In wireless communications system 200 utilizing LTE-CW, the robustness of the dedicated band may be leveraged to use an LTE link to improve performance and coverage of the Wi-Fi link in the unlicensed band. LTE-CW technology may be used in areas that support multiple UEs 115, Wi-fi APs 205 and/or other base stations 105 from different operators. However, in some cases, simultaneous transmissions by base stations 105 of different operators or Wi-Fi APs 205 may interfere with one another and may degrade communications between devices using the shared frequency spectrum.

In some cases, base station 105-a may transmit a Wi-Fi compatible header at different instances during a DL frame. For example, the Wi-Fi compatible header may be transmitted once base station 105-a detects that the channel is clear after completing a CCA, and again at subsequent downlink subframe boundaries in the same frame. As a result, network allocation vector (NAV) information carried in the header may defer the transmissions of any additional LTE-CW base stations for other operators or any Wi-Fi APs 205 within the range of the LTE-CW/LTE-CW or LTE-CW/Wi-Fi coexisting networks. Additionally, the receive address field in the header may include the transmit address of the sending LTE-CW node. Therefore, a functionality of the header may be similar that of a CTS-to-Self frame transmission used in Wi-Fi (e.g., a transmission of a CTS packet that includes the sending nodes own address). The CTS-to-Self transmission may provide NAV protection to the subsequent frames in the communication sequence. However, when communication by a LTE-CW system uses multiple bands (e.g., multiple 20 MHz bands), the header information may only be transmitted across one of the bands, which may result in interference from other nearby base stations 105 or Wi-Fi devices that are contending for the same resources.

A CTS-to-Self transmission may be used for communications in LTE-CW systems to achieve efficient multi-band transmissions with the coexistence of multiple LTE-CW base stations or multiple Wi-Fi APs. As a result, a relatively greater penetration of CTS-to-Self transmissions may be achieved, and transmissions from LTE-CW nodes controlled by different operators or Wi-Fi access points may be deferred, allowing communication with reduced interference.

In wireless communications system 200, CTS-to-Self transmission by a LTE-CW base station 105-a may be incorporated in a header transmission. In some cases, a CTS-to-Self header may be transmitted by a base station 105-a according different techniques. For example, base station 105-a may detect that a channel is clear following a CCA procedure and may subsequently transmit a special header, where the special header may include multiple TTIs that each include a header packet in each sub-band (e.g., a block of multiple 20 MHz header packets). Additionally or alternately, base station 105-a may transmit the header packets in a duplicated format in all sub-bands at subsequent downlink subframe boundaries within the same frame. In some examples, base station 105-a may transmit the special header that includes header packets with equal power level (e.g., at half power) in all scheduled sub-bands and then alternate transmissions of header packets at a different power level in each sub-band (e.g., at full power).

In some examples, a fixed transmission pattern of header packets may be used for a special header transmission, where the headers in all sub-bands may be transmitted with evenly split power followed by sequential headers in each sub-band with full power. In other cases, the header packets may be transmitted in a random or predetermined hopping pattern (e.g., a non-consecutive pattern over all sub-bands). In some cases, the header information may be the same for all base stations 105 for the same operator, and may be transmitted at different times by different operators. Therefore, an LTE-CW node of a different operator or a Wi-Fi node (e.g., Wi-Fi AP 205) may receive multiple CTS-to-Self transmissions simultaneously (which may be identical). The simultaneous reception of the CTS-to-Self transmission may facilitate improved packet detection, as the energy may be boosted through the combination of identical transmissions. In some cases, the CCA process may have a different duration for different LTE-CW operators, such that special headers for different operators may not be transmitted at the same time.

In some cases, the special header may be transmitted over a relatively short duration, which may block interfering transmission by base stations 105 of another operator or Wi-Fi nodes (e.g., Wi-Fi AP 205). For example, Wi-Fi AP 205 may operate in a lower sub-band in the shared frequency spectrum and may be beyond the coverage of base station 105-a associated with a first header packet transmitted at a lower power level (e.g., half power). Base station 105-*a* may transmit, as part of the special header and in as short of a duration as possible, an additional header packet across each sub-band at a greater power level (e.g., full power). In such examples, Wi-Fi AP 205 may receive the CTS-to-Self header transmission and may defer transmissions as a result.

Figure 3:
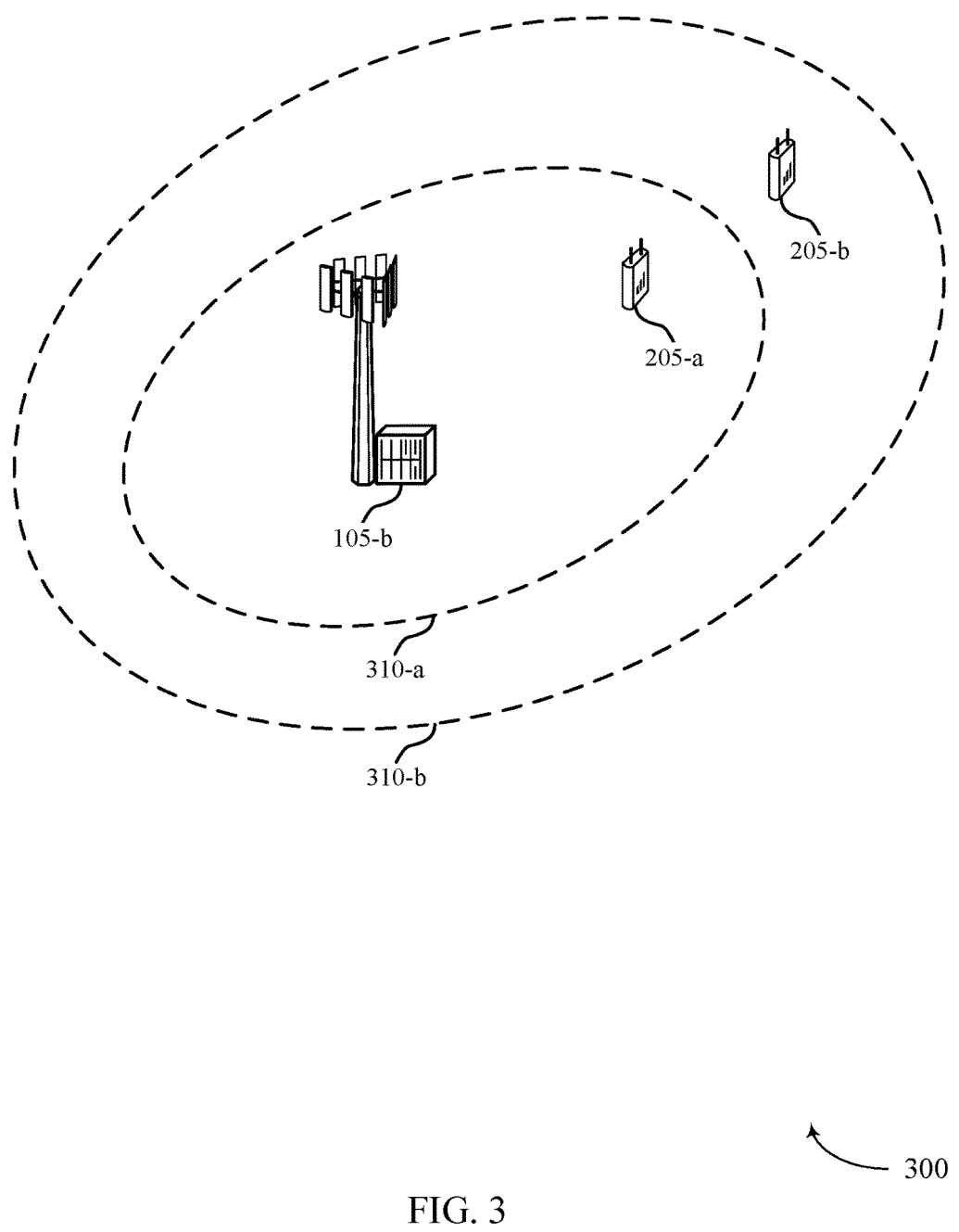
FIG. 3 illustrates an example of wireless communications system that supports clear to send-to-self transmissions in an LTE controlled Wi-Fi system in accordance with aspects of the present disclosure.

FIG. 3 illustrates an example of a wireless communications system 300 for CTS-to-self transmissions in an LTE controlled Wi-Fi system. In some cases, wireless communications system 300 may represent aspects of techniques performed by a UE 115 or base station 105 as described with reference to FIGS. 1-2 wireless communications system 300 may represent an LTE-CW network that includes a base station 105-*b*, and Wi-Fi AP 205-*a*, and Wi-Fi AP 205-*b*. Wireless communications system 300 may support communication in a shared frequency spectrum using a special header, where the special header may include multiple header packets with a CTS-to-Self frame structure.

In wireless communications system 300, base station 105-*b* may communicate using multiple sub-bands of a radio frequency spectrum. A special header may be included in a subframe transmitted by base station 105-*b*, where the special header may include a multiple TTIs with header packets in each sub-band. The first TTI in the special header may include header packets transmitted at a first power level (e.g., half power), and subsequent TTIs may include header packets transmitted at a different power level (e.g., full power) across each of the sub-bands. The header packets may include a CTS-to-Self frame structure.

In some examples, a first power level coverage area 310-*a* may be associated with header packets transmitted at the first power level, which may be a relatively lower power level than the different power level. As a result, one or more Wi-Fi AP 205-*a* located within first power level coverage area 310-*a* may receive the first header packet that includes the CTS-to-Self information, and may refrain from transmitting over the shared frequency spectrum.

In such cases, one or more Wi-Fi AP 205-*b* may be located outside of the first power level coverage area 310-*a* and may not receive the first TTIs that include header packets at the first power level. However, Wi-Fi AP 205-*b* may be within the different power level coverage area 310-*b* associated with the header packets transmitted at the different power level (which may be relatively greater than the first power level, as discussed above). Upon receipt of the additional TTI(s), Wi-Fi AP 205-*b* may receive the header packets that include the CTS-to-Self information and refrain from transmitting over the shared frequency spectrum. In some examples, the duration between the first TTI and the additional TTI(s) may be as short as possible to ensure Wi-Fi AP 205-*b* does not transmit prior to receiving the additional TTI(s) (and corresponding header packets) from base station 105-*b*.

Figure 4:
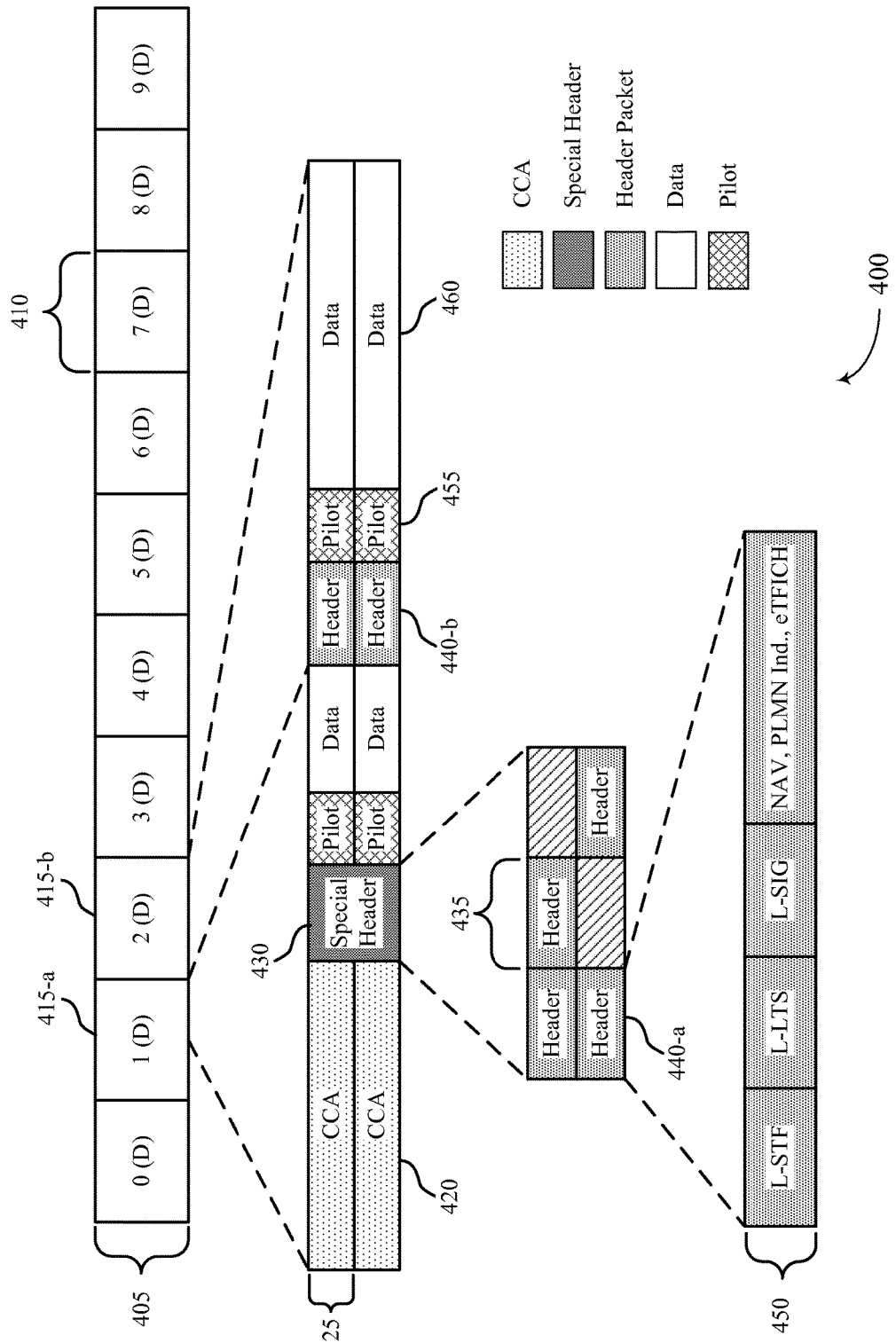
FIG. 4 illustrates an example of a subframe configuration that supports clear to send-to-self transmissions in an LTE controlled Wi-Fi system in accordance with aspects of the present disclosure.

FIG. 4 illustrates an example of a subframe configuration 400 for clear to send-to-self transmissions in an LTE controlled Wi-Fi system. In some cases, subframe configuration 400 may represent aspects of techniques performed by a UE 115 or base station 105 as described with reference to FIGS. 1-2. FIG. 4 describes a subframe structure which may be used for the transmission of a special header.

In some examples, a frame 405 transmitted by a LTE-CW base station may include multiple subframes 410 used for communication in the shared radio frequency spectrum. Frame 405 may be transmitted across a channel including multiple sub-bands 425 of the radio frequency spectrum. A downlink subframe 415-*a* may include a subframe configuration used for contending for access to the shared frequency spectrum. Thus, a subframe configuration may include CCA 420 transmitted across each of the multiple sub-bands 425, followed by special header 430 (e.g., a header that includes multiple TTIs 435). Each TTI 435 may include header packet 440-*a* for each sub-band 425.

In some cases, a first TTI 435 may be transmitted at a first power level, and subsequent TTIs 435 may include header packets 440-*a* transmitted at a different power level profile, where the first power level may be relatively less than the different power level. In some cases, the subsequent TTIs 435 may be transmitted in a consecutive pattern, a non-consecutive pattern, or a combination of consecutive and non-consecutive patterns across each of the sub-bands 425. As an example, a special header may be transmitted in a 40 MHz channel, and in first TTI 435 a header packet 440-*a* may be transmitted at half power in each 20 MHz sub-band of the 40 MHz channel. In a second TTIs 435 immediately following the first TTI 435, a header packet 440-*a* may be transmitted at full power in the first 20 MHz sub-band. In a third TTI 435 immediately following the second TTI 435, a header packet 440-*a* may be transmitted in the second 20 MHz sub band.

In some examples, header packet 440-*a* may be identifiable to both LTE-CW and Wi-Fi devices. As a result, a header packet 440-*a* may include consecutive symbols, such as a legacy short training field (L-STF), a legacy long training field (L-LTF), and a legacy signal field (L-SIG), that may be used in coexisting systems. In such cases, the header packet may also include a NAV duration, a public land mobile network (PLMN) indicator, eTFICH, etc. In some cases, the NAV duration may indicate a certain NAV value (e.g., a value that can be set up to 32,768 µs), the PLMN indicator may specify multiple identities (e.g., up to six identities), and eTFICH may provide the ratio in a radio frame.

Subsequent to the transmission of special header 430, the subframe configuration may include a pilot symbol 455 followed by communication data 460. Additionally or alternatively, an additional header packet 440-*b* may be transmitted synchronously at the boundary of subsequent subframes (e.g., the boundary between subframe 415-*a* and 415-*b*, and at the boundary of all subsequent subframes 410). In some examples, the additional header packet may be transmitted across all sub-bands 425 at the first power level or the different power level.

Figure 5:
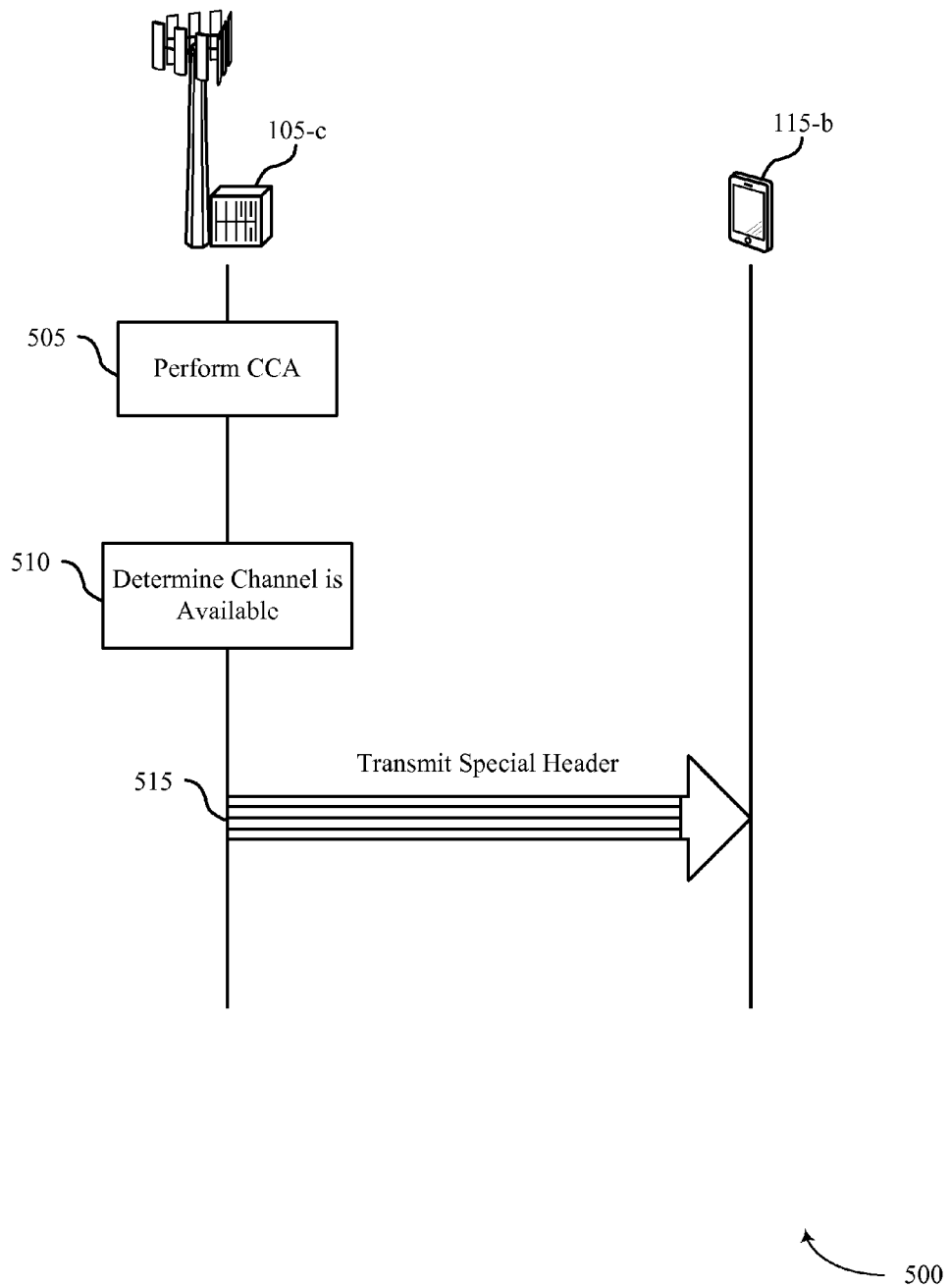
FIG. 5 illustrates an example of a process flow in a system that supports clear to send-to-self transmissions in an LTE controlled Wi-Fi system in accordance with aspects of the present disclosure.

FIG. 5 illustrates an example of a process flow 500 for clear to send-to-self transmissions in an LTE controlled Wi-Fi system in accordance with various aspects of the present disclosure. Process flow 500 may include base station 105-*c* and UE 115-*b*, which may be examples of the corresponding devices described with reference to FIGS. 1-2.

At step 505, base station 105-*c* may perform a CCA procedure on a channel operating across multiple sub-bands of a radio frequency spectrum band. At step 510, base station 105-*c* may determine the channel is available based at least in part on the performed CCA.

At step 515, base station 105-*c* may transmit a special header in the channel operating across multiple sub-bands, where the special header includes multiple TTIs, each TTI including a header packet in each of the sub-bands. In some cases, base station 105-*c* may transmit a first TTI of the multiple TTIs at a first power level and transmit subsequent TTIs at a different power level. In some cases the first power level may be less than the different power level. In some cases, the header packet may include a CTS-to-self frame structure. Base station 105-*c* may further transmit additional header packets in the sub-bands of the radio frequency spectrum band, where each of the additional header packets are transmitted at the first or different power level. In some cases, the additional headers may be transmitted synchronously at a boundary of subsequent subframes. In some cases, base station 105-c may transmit the header packets in a consecutive or a non-consecutive pattern across each sub-band of the radio frequency spectrum band, where the pattern is based at least in part on the CCA.

In some cases, base station 105-c may transmit the special header at a first time for a first operator and a second time for a different operator, where the first and second time are different. In some cases, the special header may take a first configuration for a first operator and a second configuration for a different operator. In some cases, the header packet may include a Wi-Fi frame structure.

Figure 6:
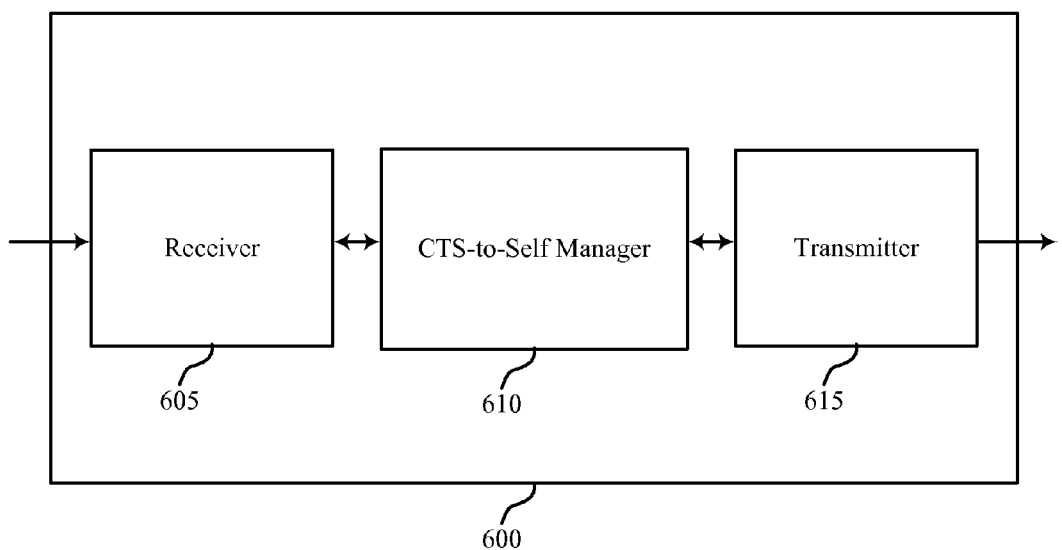
FIGS. 6 through 8 show block diagrams of a wireless device that supports clear to send-to-self transmissions in an LTE controlled Wi-Fi system in accordance with aspects of the present disclosure.

FIG. 6 shows a block diagram of a wireless device 600 that supports clear to send-to-self transmissions in an LTE controlled Wi-Fi system in accordance with various aspects of the present disclosure. Wireless device 600 may be an example of aspects of a base station 105 described with reference to FIGS. 1 and 2. Wireless device 600 may include receiver 605, CTS-to-Self manager 610 and transmitter 615. Wireless device 600 may also include a processor. Each of these components may be in communication with each other.

The receiver 605 may receive information such as packets, user data, or control information associated with various information channels (e.g., control channels, data channels, and information related to clear to send-to-self transmissions in an LTE controlled Wi-Fi system, etc.). Information may be passed on to other components of the device. The receiver 605 may be an example of aspects of the transceiver 925 described with reference to FIG. 9.

The CTS-to-Self manager 610 may perform a clear channel assessment procedure on a channel operating across multiple sub-bands of a radio frequency spectrum band, determine the channel is available based at least in part on the performed clear channel assessment, and transmit a special header in the channel operating across multiple sub-bands, where the special header includes two or more TTIs, each TTI including a header packet in each of two or more sub-bands. The CTS-to-Self manager 610 may also be an example of aspects of the CTS-to-Self manager 905 described with reference to FIG. 9.

The transmitter 615 may transmit signals received from other components of wireless device 600. In some examples, the transmitter 615 may be collocated with a receiver in a transceiver module. For example, the transmitter 615 may be an example of aspects of the transceiver 925 described with reference to FIG. 9. The transmitter 615 may include a single antenna, or it may include a plurality of antennas.

Figure 7:
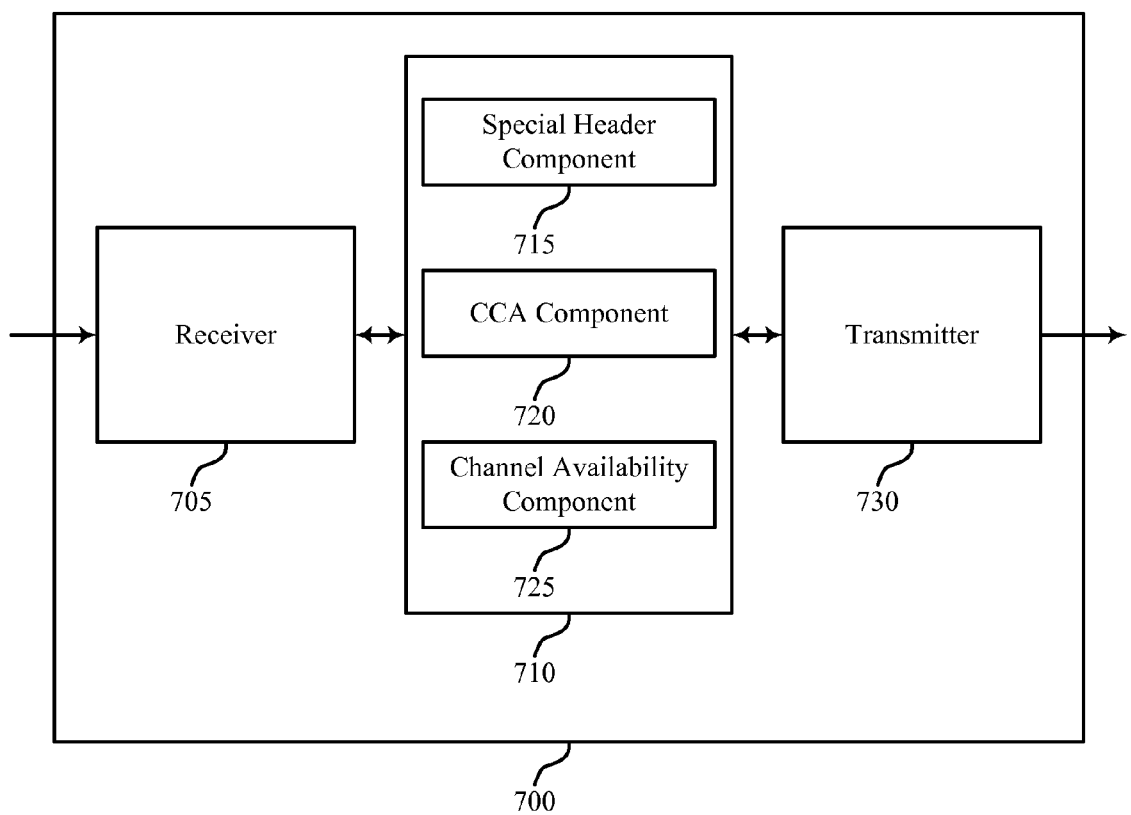

FIG. 7 shows a block diagram of a wireless device 700 that supports clear to send-to-self transmissions in an LTE controlled Wi-Fi system in accordance with various aspects of the present disclosure. Wireless device 700 may be an example of aspects of a wireless device 600 or a base station 105 described with reference to FIGS. 1, 2 and 6. Wireless device 700 may include receiver 705, CTS-to-Self manager 710 and transmitter 730. Wireless device 700 may also include a processor. Each of these components may be in communication with each other.

The receiver 705 may receive information which may be passed on to other components of the device. The receiver 705 may also perform the functions described with reference to the receiver 605 of FIG. 6. The receiver 705 may be an example of aspects of the transceiver 925 described with reference to FIG. 9. The CTS-to-Self manager 710 may be an example of aspects of CTS-to-Self manager 610 described with reference to FIG. 6. The CTS-to-Self manager 710 may include special header component 715, CCA component 720 and channel availability component 725. The CTS-to-Self manager 710 may be an example of aspects of the CTS-to-Self manager 905 described with reference to FIG. 9.

The special header component 715 may transmit the special header at a first time for a first operator and a second time for a second operator, and transmit a special header in the channel operating across multiple sub-bands, where the special header includes two or more TTIs, each TTI including a header packet in each of two or more sub-bands. In some cases, the header packet includes a clear to send-to-self frame structure. In some cases, the first time is different than the second time. In some cases, the special header is of a first configuration for a first operator and a second configuration for a second operator. In some cases, the header packet includes a wireless fidelity frame structure.

The CCA component 720 may perform a clear channel assessment procedure on a channel operating across multiple sub-bands of a radio frequency spectrum band. The channel availability component 725 may determine the channel is available based at least in part on the performed clear channel assessment.

The transmitter 730 may transmit signals received from other components of wireless device 700. In some examples, the transmitter 730 may be collocated with a receiver in a transceiver module. For example, the transmitter 730 may be an example of aspects of the transceiver 925 described with reference to FIG. 9. The transmitter 730 may utilize a single antenna, or it may utilize a plurality of antennas.

Figure 8:
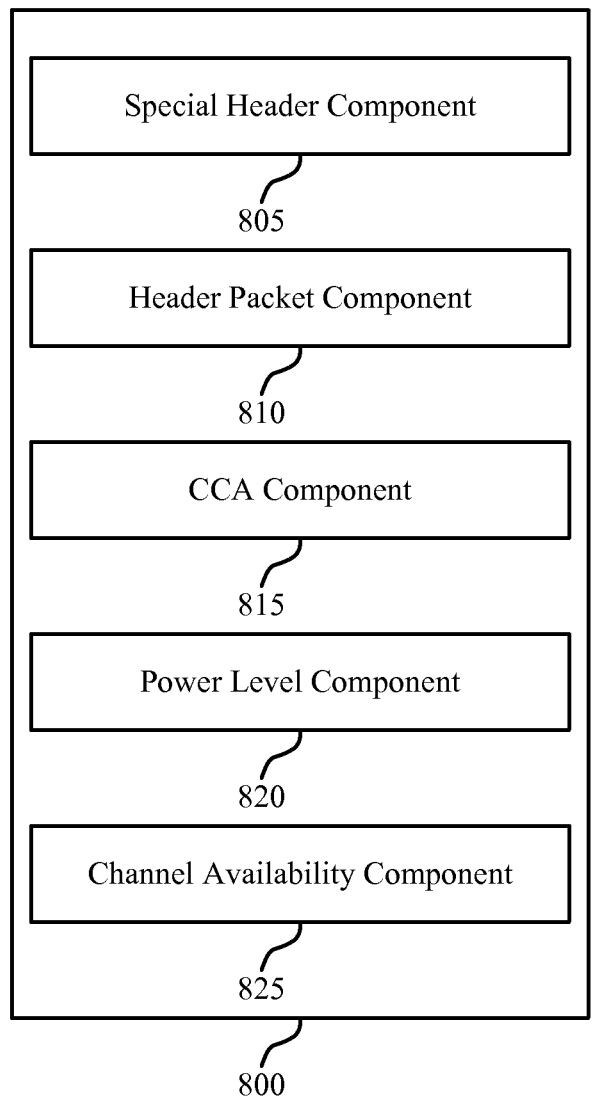

FIG. 8 shows a block diagram of a CTS-to-Self manager 800 which may be an example of the corresponding component of wireless device 600 or wireless device 700. That is, CTS-to-Self manager 800 may be an example of aspects of CTS-to-Self manager 610 or CTS-to-Self manager 710 described with reference to FIGS. 6 and 7. The CTS-to-Self manager 800 may also be an example of aspects of the CTS-to-Self manager 905 described with reference to FIG. 9.

The CTS-to-Self manager 800 may include special header component 805, header packet component 810, CCA component 815, power level component 820 and channel availability component 825. Each of these modules may communicate, directly or indirectly, with one another (e.g., via one or more buses).

The special header component 805 may transmit the special header at a first time for a first operator and a second time for a second operator, and transmit a special header in the channel operating across multiple sub-bands, where the special header includes two or more TTIs, each TTI including a header packet in each of two or more sub-bands. In some cases, the header packet includes a clear to send-to-self frame structure. In some cases, the first time is different than the second time. In some cases, the special header is of a first configuration for a first operator and a second configuration for a second operator. In some cases, the header packet includes a wireless fidelity frame structure.

The header packet component 810 may transmit one or more additional header packets in the two or more sub-bands of the radio frequency spectrum band, where each of the additional header packets are transmitted at the first power level or the different power level, transmit the header packet in a consecutive pattern across each sub-band of the radio frequency spectrum band, where the consecutive pattern is based at least in part on the clear channel assessment, and transmit the header packet in a non-consecutive pattern across each sub-band of the radio frequency spectrum band, where the non-consecutive pattern is based at least in part on the clear channel assessment. In some cases, the one or more additional headers are transmitted synchronously at a boundary of subsequent subframes. The CCA component 815 may perform a clear channel assessment procedure on a channel operating across multiple sub-bands of a radio frequency spectrum band.

The power level component 820 may transmit a first TTI of the two or more TTIs across each of the two or more sub-bands at a first power level, and transmit one or more subsequent TTIs of the two or more TTIs across the two or more sub-bands at a different power level. In some cases, the first power level is less than the different level. The channel availability component 825 may determine the channel is available based at least in part on the performed clear channel assessment.

Figure 9:
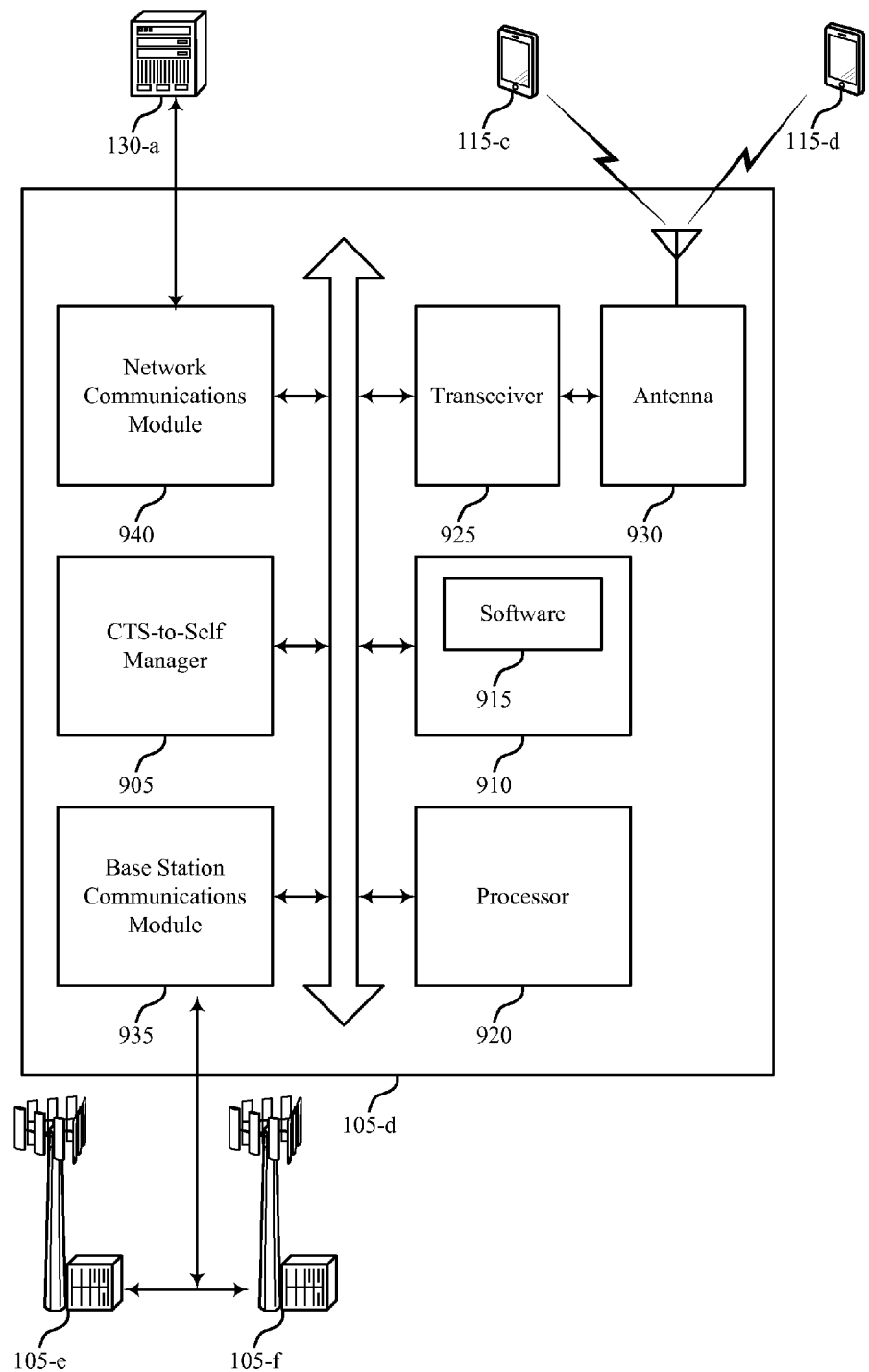
FIG. 9 illustrates a block diagram of a system including a base station that supports clear to send-to-self transmissions in an LTE controlled Wi-Fi system in accordance with aspects of the present disclosure.

FIG. 9 shows a diagram of a wireless system 900 including a device configured that supports clear to send-to-self transmissions in an LTE controlled Wi-Fi system in accordance with various aspects of the present disclosure. For example, wireless system 900 may include base station 105-d, which may be an example of a wireless device 600, a wireless device 700, or a base station 105 as described with reference to FIGS. 1, 2 and 6 through 8. Base station 105-d may also include components for bi-directional voice and data communications including components for transmitting communications and components for receiving communications. For example, base station 105-d may communicate bi-directionally with one or more UEs 115.

Base station 105-d may also include CTS-to-Self manager 905, memory 910, processor 920, transceiver 925, antenna 930, base station communications module 935 and network communications module 940. Each of these modules may communicate, directly or indirectly, with one another (e.g., via one or more buses). The CTS-to-Self manager 905 may be an example of a CTS-to-Self manager as described with reference to FIGS. 6 through 8.

The memory 910 may include random access memory (RAM) and read only memory (ROM). The memory 910 may store computer-readable, computer-executable software including instructions that, when executed, cause the processor to perform various functions described herein (e.g., clear to send-to-self transmissions in an LTE controlled Wi-Fi system, etc.). In some cases, the software 915 may not be directly executable by the processor but may cause a computer (e.g., when compiled and executed) to perform functions described herein. The processor 920 may include an intelligent hardware device, (e.g., a central processing unit (CPU), a microcontroller, an application specific integrated circuit (ASIC), etc.).

The transceiver 925 may communicate bi-directionally, via one or more antennas, wired, or wireless links, with one or more networks, as described above. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas.

In some cases, the wireless device may include a single antenna 930. However, in some cases the device may have more than one antenna 930, which may be capable of concurrently transmitting or receiving multiple wireless transmissions.

The base station communications module 935 may manage communications with other base station 105, and may include a controller or scheduler for controlling communications with UEs 115 in cooperation with other base stations 105. For example, the base station communications module 935 may coordinate scheduling for transmissions to UEs 115 for various interference mitigation techniques such as beamforming or joint transmission. In some examples, base station communications module-95 may provide an X2 interface within an LTE/LTE-A wireless communication network technology to provide communication between base stations 105.

The network communications module 940 may manage communications with the core network (e.g., via one or more wired backhaul links). For example, the network communications module 940 may manage the transfer of data communications for client devices, such as one or more UEs 115.

Figure 10:
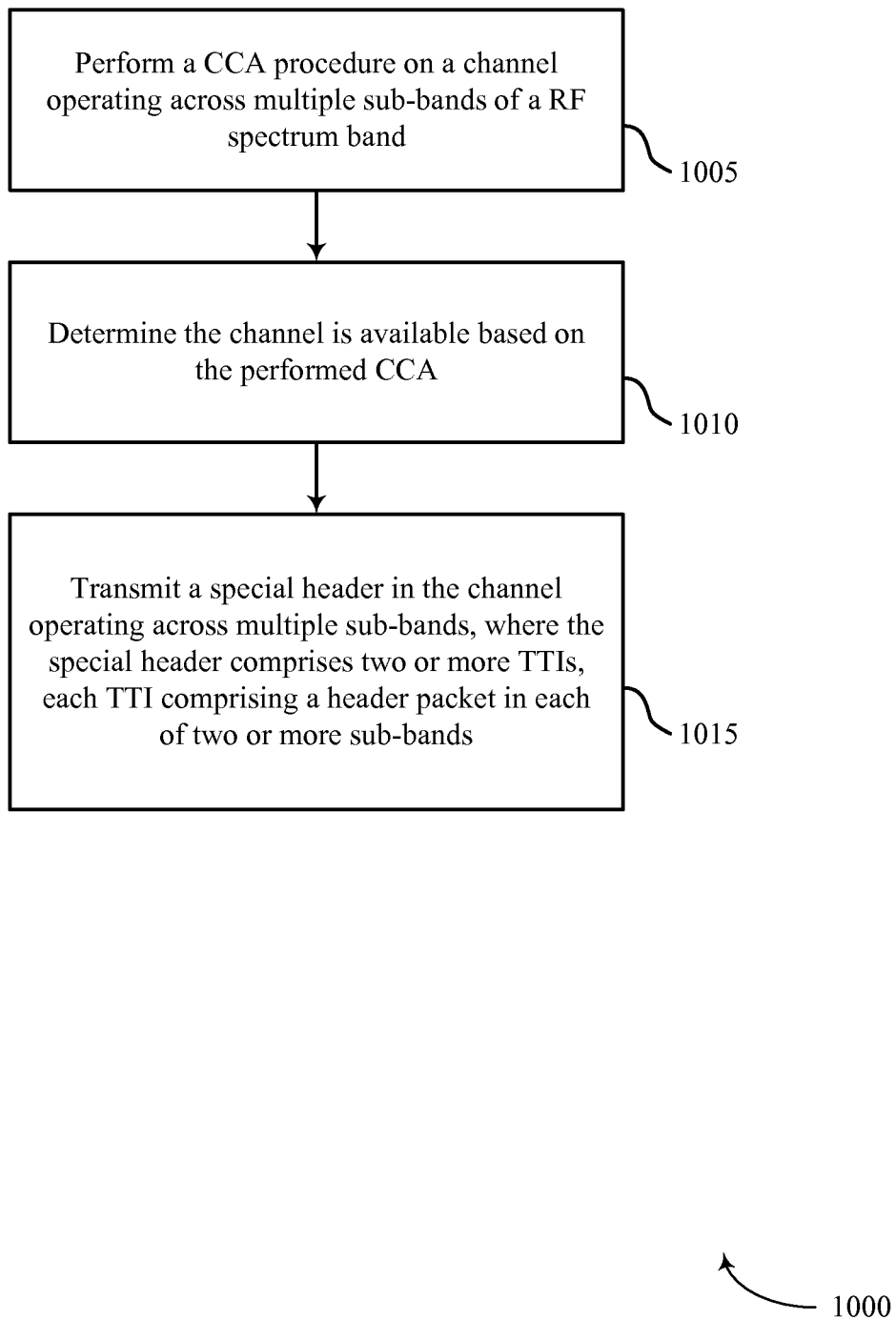
FIGS. 10 through 12 illustrate methods for clear to send-to-self transmissions in an LTE controlled Wi-Fi system in accordance with aspects of the present disclosure.

FIG. 10 shows a flowchart illustrating a method 1000 for clear to send-to-self transmissions in an LTE controlled Wi-Fi system in accordance with various aspects of the present disclosure. The operations of method 1000 may be implemented by a base station 105 or its components as described with reference to FIGS. 1 and 2. For example, the operations of method 1000 may be performed by the CTS-to-Self manager as described herein. In some examples, the base station 105 may execute a set of codes to control the functional elements of the device to perform the functions described below. Additionally or alternatively, the base station 105 may perform aspects the functions described below using special-purpose hardware.

At block 1005, the base station 105 may perform a CCA procedure on a channel operating across multiple sub-bands of a RF spectrum band as described above with reference to FIGS. 2 through 5. In certain examples, the operations of block 1005 may be performed by the CCA component as described with reference to FIGS. 7 and 8.

At block 1010, the base station 105 may determine the channel is available based on the performed CCA as described above with reference to FIGS. 2 through 5. In certain examples, the operations of block 1010 may be performed by the channel availability component as described with reference to FIGS. 7 and 8.

At block 1015, the base station 105 may transmit a special header in the channel operating across multiple sub-bands, where the special header includes two or more TTIs, each TTI including a header packet in each of two or more sub-bands as described above with reference to FIGS. 2 through 5. In certain examples, the operations of block 1015 may be performed by the special header component as described with reference to FIGS. 7 and 8.

Figure 11:
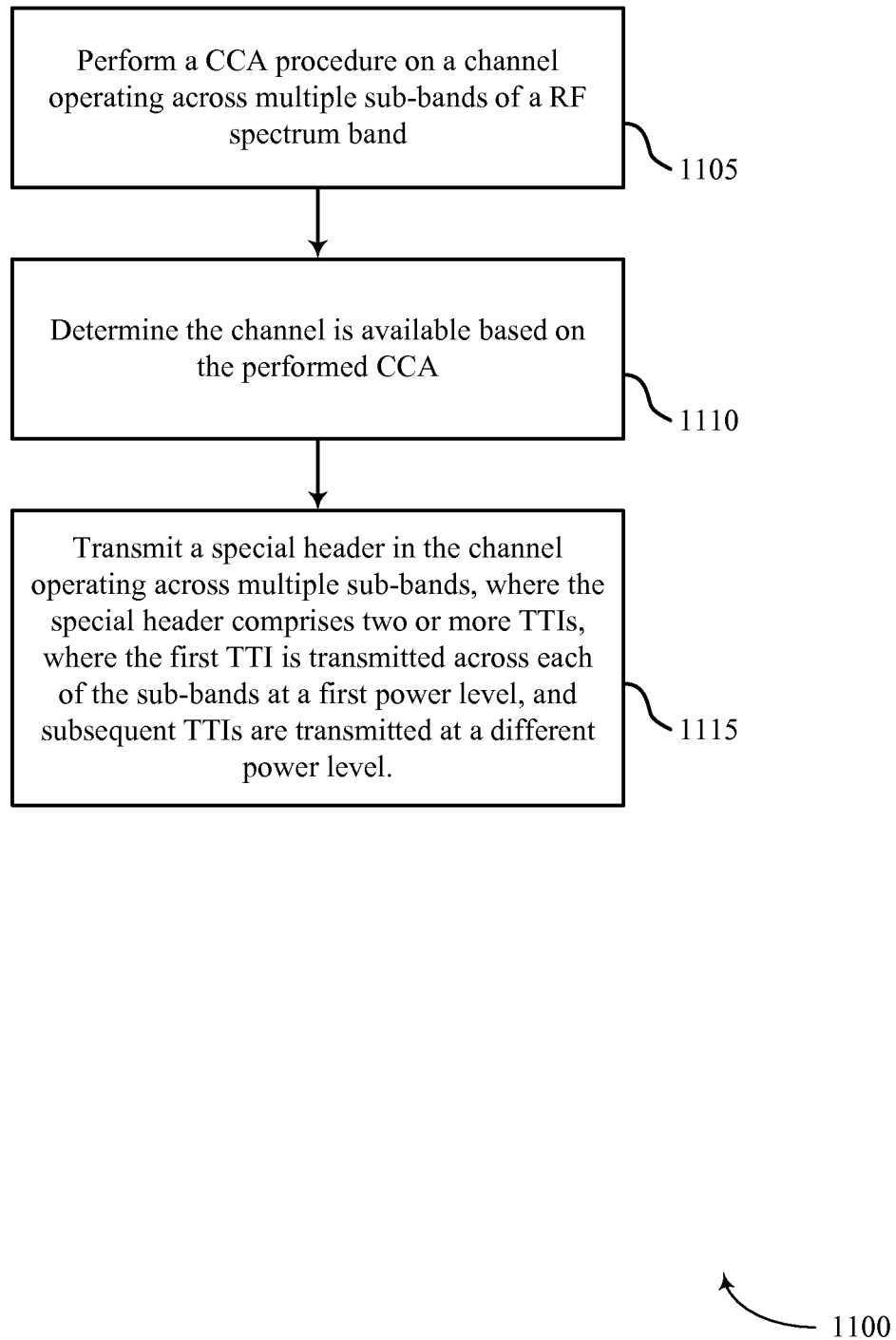

FIG. 11 shows a flowchart illustrating a method 1100 for clear to send-to-self transmissions in an LTE controlled Wi-Fi system in accordance with various aspects of the present disclosure. The operations of method 1100 may be implemented by a base station 105 or its components as described with reference to FIGS. 1 and 2. For example, the operations of method 1100 may be performed by the CTS-to-Self manager as described herein. In some examples, the base station 105 may execute a set of codes to control the functional elements of the device to perform the functions described below. Additionally or alternatively, the base station 105 may perform aspects the functions described below using special-purpose hardware.

At block 1105, the base station 105 may perform a CCA procedure on a channel operating across multiple sub-bands of a RF spectrum band as described above with reference to FIGS. 2 through 5. In certain examples, the operations of block 1105 may be performed by the CCA component as described with reference to FIGS. 7 and 8.

At block 1110, the base station 105 may determine the channel is available based on the performed CCA as described above with reference to FIGS. 2 through 5. In certain examples, the operations of block 1110 may be performed by the channel availability component as described with reference to FIGS. 7 and 8.

At block 1115, the base station 105 may transmit a special header in the channel operating across multiple sub-bands, where the special header includes two or more TTIs, each TTI including a header packet in each of two or more sub-bands. The base station 105 may transmit a first TTI of the two or more TTIs across each of the two or more sub-bands at a first power level, and transmit one or more subsequent TTIs of the two or more TTIs across the two or more sub-bands at a different power level as described above with reference to FIGS. 2 through 5. In certain examples, the operations of block 1115 may be performed by the special header component as described with reference to FIGS. 7 and 8.

Figure 12:
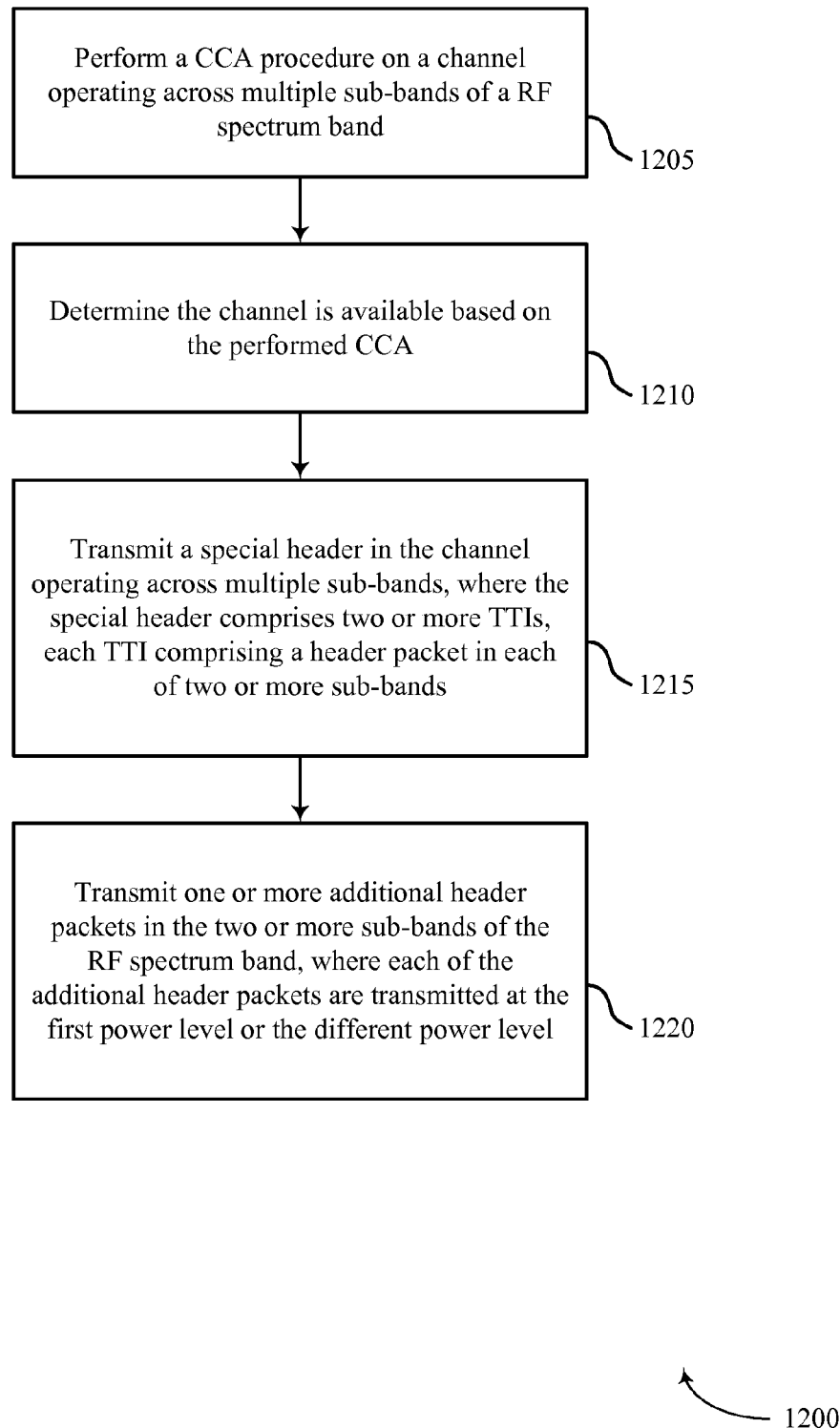

FIG. 12 shows a flowchart illustrating a method 1200 for clear to send-to-self transmissions in an LTE controlled Wi-Fi system in accordance with various aspects of the present disclosure. The operations of method 1200 may be implemented by a base station 105 or its components as described with reference to FIGS. 1 and 2. For example, the operations of method 1200 may be performed by the CTS-to-Self manager as described herein. In some examples, the base station 105 may execute a set of codes to control the functional elements of the device to perform the functions described below. Additionally or alternatively, the base station 105 may perform aspects the functions described below using special-purpose hardware.

At block 1205, the base station 105 may perform a CCA procedure on a channel operating across multiple sub-bands of a RF spectrum band as described above with reference to FIGS. 2 through 5. In certain examples, the operations of block 1205 may be performed by the CCA component as described with reference to FIGS. 7 and 8.

At block 1210, the base station 105 may determine the channel is available based on the performed CCA as described above with reference to FIGS. 2 through 5. In certain examples, the operations of block 1210 may be performed by the channel availability component as described with reference to FIGS. 7 and 8.

At block 1215, the base station 105 may transmit a special header in the channel operating across multiple sub-bands, where the special header includes two or more TTIs, each TTI including a header packet in each of two or more sub-bands as described above with reference to FIGS. 2 through 5. In certain examples, the operations of block 1215 may be performed by the special header component as described with reference to FIGS. 7 and 8.

At block 1220, the base station 105 may transmit one or more additional header packets in the two or more sub-bands of the RF spectrum band, where each of the additional header packets are transmitted at the first power level or the different power level as described above with reference to FIGS. 2 through 5. In certain examples, the operations of block 1220 may be performed by the header packet component as described with reference to FIGS. 7 and 8.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for clear to send-to-self transmissions in an LTE controlled Wi-Fi system.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical (PHY) locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA (FDMA), OFDMA (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an AP, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base station of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for clear to send-to-self transmissions in an LTE controlled Wi-Fi system. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. A method of wireless communication comprising:
performing a clear channel assessment (CCA) procedure on a channel operating across multiple sub-bands of a radio frequency (RF) spectrum band;
determining the channel is available based at least in part on the performed CCA; and
transmitting a special header in the channel operating across the multiple sub-bands, the special header comprising multiple instances of a header packet across the multiple sub-bands and transmitted during two or more transmission time intervals (TTIs), each instance of the header packet comprising a first set of fields used by a first radio access technology and a second set of fields used by a second radio access technology, wherein a first TTI of the two or more TTIs includes a first instance of the header packet in a first sub-band of the multiple sub-bands, and a second instance of the header packet in a second sub-band of the multiple sub-bands, wherein a second TTI of the two or more TTIs that is subsequent to the first TTI includes a third instance of the header packet in one of the multiple sub-bands, and wherein a third TTI of the two or more TTIs includes a fourth instance of the header packet in a different sub-band than the one of the multiple sub-bands.

2. The method of claim 1, further comprising:
transmitting the first and second instances of the header packet during the first TTI of the two or more TTIs at a first power level; and
transmitting the third instance of the header packet during the second TTI and the fourth instance of the header packet during the third TTI at a different power level.

3. The method of claim 2, wherein the first power level is less than the different power level.

4. The method of claim 1, wherein the header packet comprises a clear to send-to-self frame structure.

5. The method of claim 2, further comprising:
transmitting one or more additional header packets in the multiple sub-bands of the RF spectrum band, wherein each of the additional header packets are transmitted at the first power level or the different power level.

6. The method of claim 5, wherein the one or more additional header packets are transmitted synchronously at a boundary of subsequent subframes.

7. The method of claim 1, further comprising:
transmitting the multiple instances of the header packet in a consecutive pattern across each sub-band of the RF spectrum band, wherein the consecutive pattern is based at least in part on the CCA.

8. The method of claim 1, further comprising: transmitting the multiple instances of the header packet in a non-consecutive pattern across each sub-band of the RF spectrum band, wherein the non-consecutive pattern is based at least in part on the CCA.

9. The method of claim 1, further comprising: transmitting the special header at a first time for a first operator and a second time for a second operator.

10. The method of claim 9, wherein the first time is different than the second time.

11. The method of claim 1, wherein the special header is of a first configuration for a first operator and a second configuration for a second operator.

12. The method of claim 1, wherein the header packet comprises a wireless fidelity (Wi-Fi) frame structure.

13. An apparatus for wireless communication comprising:
means for performing a clear channel assessment (CCA) procedure on a channel operating across multiple sub-bands of a radio frequency (RF) spectrum band;
means for determining the channel is available based at least in part on the performed CCA; and
means for transmitting a special header in the channel operating across the multiple sub-bands, the special header comprising multiple instances of a header packet across the multiple sub-bands and transmitted during two or more transmission time intervals (TTIs), each instance of the header packet comprising a first set of fields used by a first radio access technology and a second set of fields used by a second radio access technology, wherein a first TTI of the two or more TTIs includes a first instance of the header packet in a first sub-band of the multiple sub-bands, and a second instance of the header packet in a second sub-band of the multiple sub-bands, wherein a second TTI of the two or more TTIs that is subsequent to the first TTI includes a third instance of the header packet in one of the multiple sub-bands, and wherein a third TTI of the two or more TTIs includes a fourth instance of the header packet in a different sub-band than the one of the multiple sub-bands.

14. The apparatus of claim 13, further comprising:
means for transmitting the first and second instances of the header packet during the first TTI of the two or more TTIs at a first power level; and
means for transmitting the third instance of the header packet during the second TTI and the fourth instance of the header packet during the third TTI at a different power level.

15. The apparatus of claim 14, wherein the first power level is less than the different power level.

16. The apparatus of claim 14, further comprising:
means for transmitting one or more additional header packets in the multiple sub-hands of the RF spectrum band, wherein each of the additional header packets are transmitted at the first power level or the different power level.

17. An apparatus for wireless communication, comprising:
a processor;

memory in electronic communication with the processor; and instructions stored in the memory and operable, when executed by the processor, to cause the apparatus to:

perform a clear channel assessment (CCA) procedure on a channel operating across multiple sub-bands of a radio frequency (RF) spectrum band;

determine the channel is available based at least in part on the performed CCA; and transmit a special header in the channel operating across the multiple sub-bands, the special header comprising multiple instances of a header packet across the multiple sub-bands and transmitted during two or more transmission time intervals (TTIs), each instance of the header packet comprising a first set of fields used by a first radio access technology and a second set of fields used by a second radio access technology, wherein a first TTI of the two or more TTIs includes a first instance of the header packet in a first sub-band of the multiple sub-bands, and a second instance of the header packet in a second sub-band of the multiple sub-bands, wherein a second TTI of the two or more TTIs that is subsequent to the first TTI includes a third instance of the header packet in one of the multiple sub-bands, and wherein a third TTI of the two or more TTIs includes a fourth instance of the header packet in a different sub-band than the one of the multiple sub-bands.

18. The apparatus of claim 17, wherein the instructions are operable to cause the processor to:
transmit the first and second instances of the header packet during the first TTI of the two or more TTIs at a first power level; and
transmit the third instance of the header packet during the second TTI and the fourth instance of the header packet during the third TTI at a different power level.

19. The apparatus of claim 18, wherein the first power level is less than the different power level.

20. The apparatus of claim 17, wherein the header packet comprises a clear to send-to-self frame structure.

21. The apparatus of claim 18, wherein the instructions are operable to cause the processor to:
transmit one or more additional header packets in the multiple sub-hands of the RF spectrum band, wherein each of the additional header packets are transmitted at the first power level or the different power level.

22. The apparatus of claim 21, wherein the one or more additional header packets are transmitted synchronously at a boundary of subsequent subframes.

23. The apparatus of claim 17, wherein the instructions are operable to cause the processor to:
transmit the multiple instances of the header packet in a consecutive pattern across each sub-band of the RF spectrum band, wherein the consecutive pattern is based at least in part on the CCA.

24. The apparatus of claim 17, wherein the instructions are operable to cause the processor to:
transmit the multiple instances of the header packet in a non-consecutive pattern across each sub-band of the RF spectrum band, wherein the non-consecutive pattern is based at least in part on the CCA.

25. The apparatus of claim 17, wherein the instructions are operable to cause the processor to:
transmit the special header at a first time for a first operator and a second time for a second operator.

26. The apparatus of claim 25, wherein the first time is different than the second time.

27. The apparatus of claim 17, wherein the special header is of a first configuration for a first operator and a second configuration for a second operator.

28. The apparatus of claim 17, wherein the header packet comprises a wireless fidelity (Wi-Fi) frame structure.

29. A non-transitory computer-readable medium storing code for wireless communication, the code comprising instructions executable by a processor to perform a clear channel assessment (CCA) procedure on a channel operating across multiple sub-bands of a radio frequency (RF) spectrum band;

determine the channel is available based at least in part on the performed CCA; and transmit a special header in the channel operating across the multiple sub-bands, the special header comprising multiple instances of a header packet across the multiple sub-bands and transmitted during two or more transmission time intervals (TTIs), each instance of the header packet comprising a first set of fields used by a first radio access technology and a second set of fields used by a second radio access technology, wherein a first TTI of the two or more TTIs includes a first instance of the header packet in a first sub-band of the multiple sub-bands, and a second instance of the header packet in a second sub-band of the multiple sub-bands, wherein a second TTI of the two or more TTIs that is subsequent to the first TTI includes a third instance of the header packet in one of the multiple sub-bands, and wherein a third TTI of the two or more TTIs includes a fourth instance of the header packet n a different sub-band than the one of the multiple sub-bands.

30. The method of claim 1, wherein the first set of fields comprises network allocation vector (NAV) information to provide NAV protection to the subsequent frames transmitted on the channel.

* * * * *